United States Patent

[11] 3,545,581

[72] Inventor Bryan P. Kent
 Ithaca, New York
[21] Appl. No. 785,103
[22] Filed Dec. 19, 1968
[45] Patented Dec. 8, 1970
[73] Assignee Borg-Warner Corporation
 Chicago, Illinois
 a corporation of Delaware

[54] SPRAG ASSEMBLY FOR ONE-WAY CLUTCHES
 10 Claims, 5 Drawing Figs.
[52] U.S. Cl. .................................................. 192/45.1,
 192/104
[51] Int. Cl. ......................................................F16d 41/07,
 F16d 43/06
[50] Field of Search.......................................... 192/41(.3),
 45.1, 103(B), 104, 104(B), 104(C)

[56] References Cited
UNITED STATES PATENTS
| | | | |
|---|---|---|---|
| 2,609,904 | 9/1952 | Swenson et al. ............... | 192/45.1 |
| 2,904,148 | 9/1959 | Schneider et al. ............ | 192/45.1 |
| 2,916,124 | 12/1959 | Troendly et al............... | 192/45.1 |
| 2,917,145 | 12/1959 | Ferris et al. .................... | 192/45.1 |

Primary Examiner—Allan D. Herrmann
Attorneys—Donald W. Banner, Lyle S. Motley, C. G. Stallings and William S. McCurry ABSTRACT: An overrunning clutch is disclosed herein providing a structure whereby a drive and driven member are interconnected to provide a drive condition therebetween in one direction, of relative rotation thereof and an overrunning condition therebetween in the other direction of relative rotation thereof. A sprag assembly is shown in conjunction with the overrunning clutch and possesses a structure which provides for total disengagement of the sprags from the overrun portion of the clutch during the overrunning thereof.

PATENTED DEC 8 1970

INVENTOR
BRYAN P. KENT

BY Evan D. Roberts
ATTORNEY

SPRAG ASSEMBLY FOR ONE-WAY CLUTCHES

SUMMARY OF THE INVENTION

This invention relates to a sprag assembly for one-way overrunning clutches having an inner and an outer race wherein a sprag cage rotatably retains a series of sprags therein having inner and outer cam race engaging surfaces which are rotated into driving engagement with the races in one direction and are overrunning or disengaging in the other direction of relative rotation of the inner and outer races. The sprags are provided with a counterweight portion specifically positioned with respect thereto which will cause the sprags to rotate in the nonengaging direction under the effects of centrifugal force when the cage is rotated in overrunning condition with one of said races against the effects of a sprag engaging and urging means whereby at a predetermined rotational speed, the sprags will become completely disengaged from the races during overrunning above the predetermined speed.

Presently known types of overrunning clutches generally do not provide for total disengagement of the sprags with respect to a race being overrun thereby, and as a result, a large amount of localized wear takes place on the sprags between a race being overrun and the sprags.

Under these conditions, the overrun race will probably wear uniformly, however, the sprags will engage the overrun race at a particular point on the sprag causing the sprag to wear nonuniformly. This nonuniform wear disrupts the appropriate operation thereof of the sprags.

It is, therefore, one of the highly desirable objects of this invention to provide a sprag assembly for one-way overrunning clutches whereby the sprags thereof will be totally disengaged from the overrun race thereof during overrunning of the clutch and whereby the sprags will not receive the localized undesirable wear.

Other advantages and novel aspects of the invention will become apparent upon consideration of the following detailed description, in conjunction with the accompanying drawing wherein.

Figure 1:
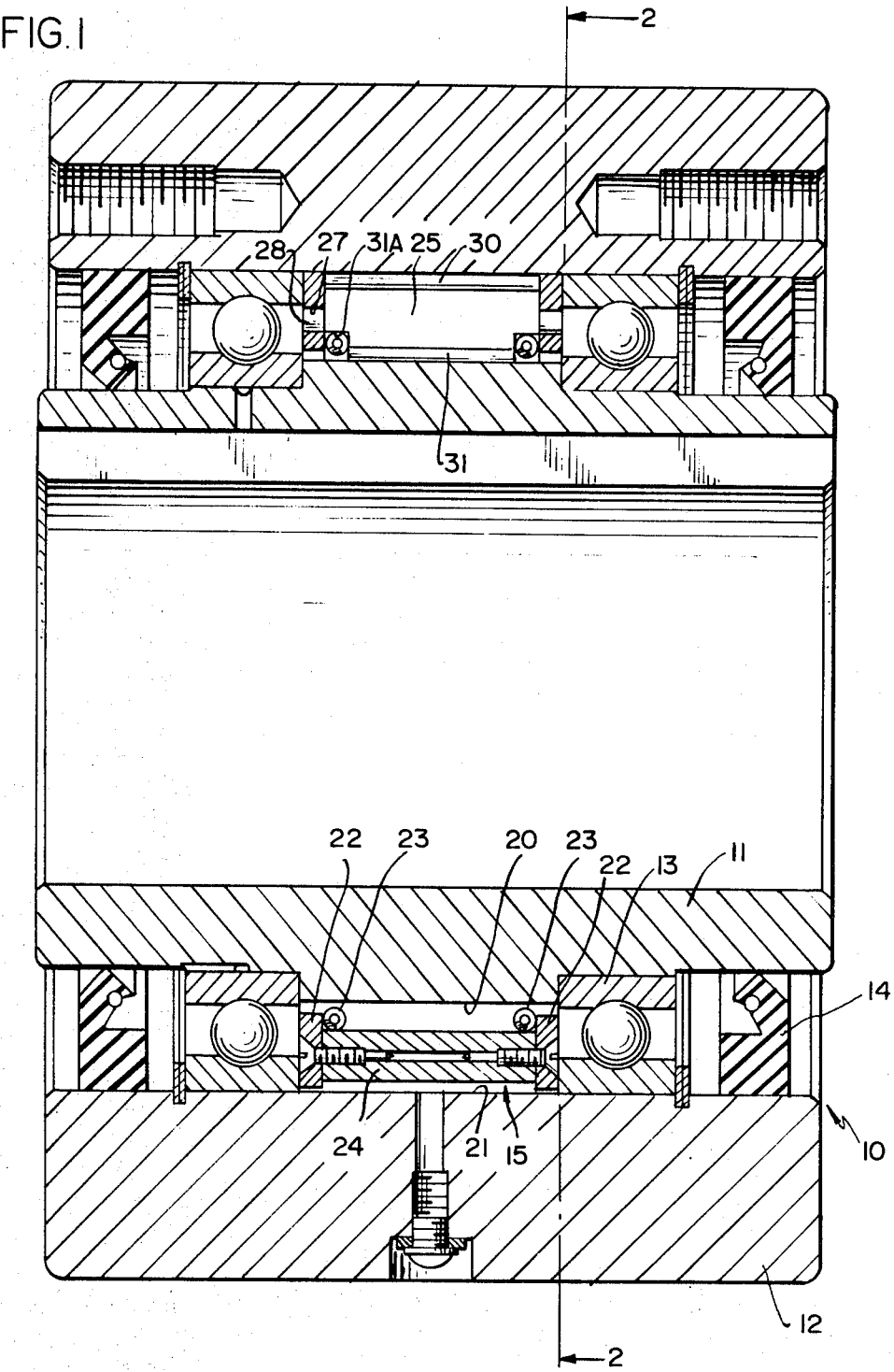
FIG. 1 is a sectional view of a one-way overrunning sprag clutch showing the novel sprag assembly of this invention.

A one-way cam or overrunning sprag clutch generally represented by the numeral 10 is disclosed herein (FIG. 1) for the purpose of illustrating the invention, and includes generally, among other things, an inner rotating drive member 11, an outer rotating drive member 12, bearings 13 supporting the outer member 12 on the inner member 11, lubricant seals 14, and the sprag assembly 15 (FIGS. 1—3) of this invention, which provides a drive or an overrunning condition between the inner and outer members 11 and 12. The inner member 11 is provided with an inner race surface 20 adjacent the sprag assembly 15 of this invention and the outer member 12 is similarly provided with an outer race surface 21 adjacent the sprag assembly 15 of this invention.

Figure 2:
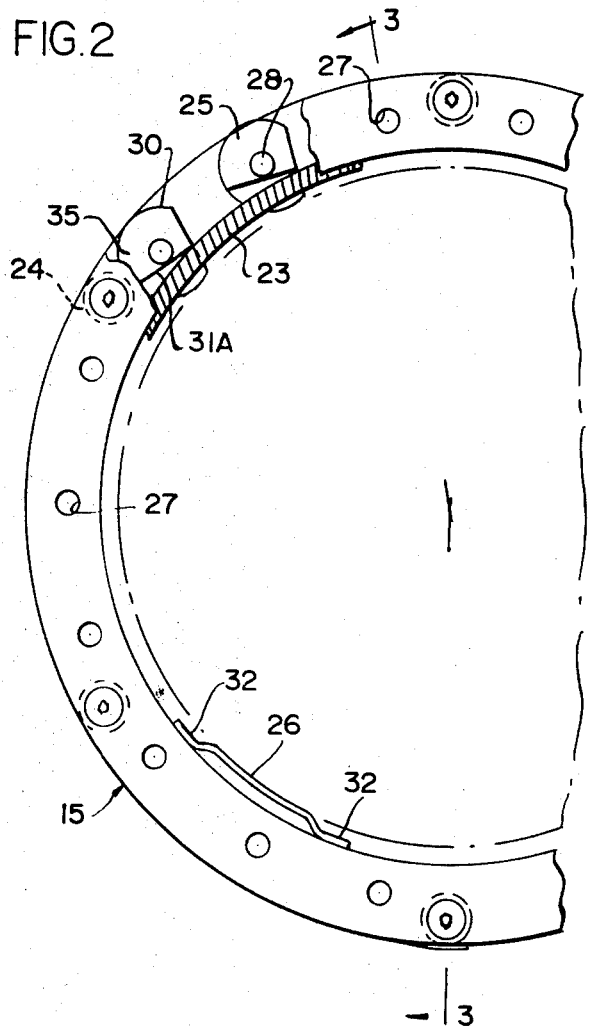
FIG. 2 is a partially broken away sectional view taken along line 2-2 of FIG. 1 showing the details of the sprag assembly.
Figure 3:
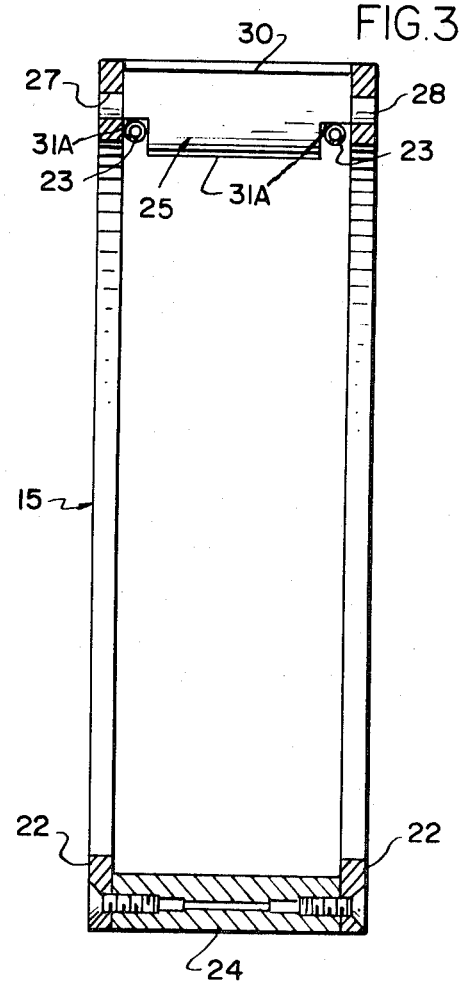
FIG. 3 is a sectional view taken along line 3-3 of FIG. 2.

The sprag assembly 15 of this invention includes generally two cage rings 22, two energizing springs 23, a series of cage spacers 24, a series of cams or sprags 25, and a yieldable friction-drag or urging means 26 (FIG. 2). The cage rings 22 are provided with circumferentially spaced apertures 27 for receiving sprag trunnions 28 and are coaxially spaced apart an appropriate distance to receive the sprags 25 therebetween by the spacers 24 held in position by screws (FIGS. 1, 2 and 3).

The sprags 25 are provided with the trunnions 28 thereof rotatably mounted in the apertures 27 of the cage rings 22 and are provided with outer cam surfaces 30 and inner cam surfaces 31 adapted to drivingly engage the outer race 21 and the inner race 20 when the inner race 20 is rotated clockwise with respect to the outer race 21 (FIGS. 2, 4 and 5) and to normally drivingly disengage and drag on the outer race in an overrunning condition when the inner race 20 is moved counterclockwise with respect to the outer race 21.

The sprags 25 are provided with a transverse surface 31A adjacent each trunnion 28 thereof. The expanding energizing springs 23 are provided in respective engagement with the transverse surfaces 31A of the sprags 25 to urge the sprags 25 counterclockwise (FIGS. 2, 4 and 5) into driving engagement between the inner and outer races 20 and 21. The spring friction drag member 26 is shown as a piece of spring steel which may be located at several points circumferentially around the sprag cage, depending on the amount of drag required. The drag spring 26 is secured to the cage ring at 32 and is bowed into resilient complemental engagement with the inner race surface 20.

The drag 26 can also be provided on the exterior surface of the cage rings 22 instead of the interior surface as shown, (FIG. 2) in the event that it is desirable to have the cage 15 rotated with the outer race 21 in the situation where the outer race is going to be the overrunning race. However, inasmuch as there is a normal tendency for a sprag cage to rotate with the associated outer race, the inventor has found that it is not always necessary to provide the friction spring drag between the outer race and the cage ring when the outer race is going to be overrunning.

Figure 4:
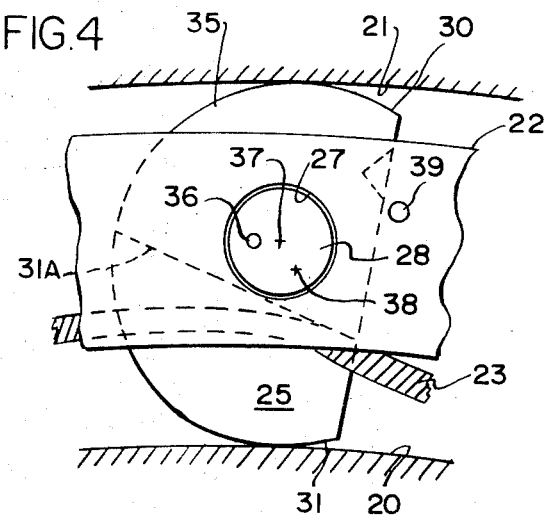
FIG. 4 is an axial view of a sprag adapted to disengage the outer race during overrunning of the inner race.

The sprags 25 to be used in an inner race overrunning situation are shown in FIG. 4 and are of a specific configuration whereby a counterweight portion 35 is provided on the left side thereof so that the center of gravity 36 of the sprags 25 will be spaced to the left from the center of rotation 37 of the trunnions 28 thereof. In the situation where the inner race 20 is going to be overrunning, on occasion, the sprag outer cam surfaces 30 have a center of curvature 38 which is generally spaced inwardly and circumferentially from the center of gravity 36 and the general center of rotation 37 of the sprags. In this situation, the sprag inner race cam surfaces 31 have a center of curvature located substantially in the center of rotation 37 of the cam trunnions 28.

In operation, when the inner race 20 is overrunning in a relatively counterclockwise direction with respect to the outer race 21, the sprag cage assembly 15 will be carried with the inner race 20 by the drag friction spring or springs 26 and accordingly, the sprags 25 will move with the inner race 20. As the speed of the inner race 20 increases, the sprags 25 will be urged clockwise (FIGS. 2 and 4) about their axis 37 with greater and greater force due to centrifugal force acting on the eccentric center of gravity 36 thereof.

The rotation of the sprags 25 due to the centrifugal force will be resisted by the expanding energizing spring 23 until the rotational speed of the sprag reaches a point where the centrifugal action on the sprags 25 is equal to or greater than the expanding force of the energizing spring 23, after which, further increase in rotational speed of the sprag assembly 15 will cause the sprags 25 thereof to rotate clockwise (FIG. 4) with respect to the trunnion axis 37 in the cage rings 22. When this centrifugal rotation of the sprag takes place, the inner race cam engaging surfaces 31 will roll on the inner race surface 20 about the axis 37 of the sprag trunnions 28, and the outer race cam engaging surfaces 30 of the sprags 25 will be rotated out of engagement with the outer race 21 to provide a complete disengagement between the sprags 25 and the outer race 21 during the overrunning of the inner race 20 beyond the predetermined centrifugal speed to overcome the expanding energizing force of the springs 23. To maintain the sprags 25 in position for ready and appropriate driving reengagement with the inner and outer race 20 and 21 after this disengagement as above described, the sprags 25 may be restrained from excessive centrifugal rotation at excessively high overrunning speeds by providing a crossbar stop 39 between the cage rings 22 adjacent each of the sprags 25 or the sprags 25 may be sufficiently closely positioned to one another to engage one another after a predetermined centrifugal rotation action to prevent undue rotation thereof.

Figure 5:
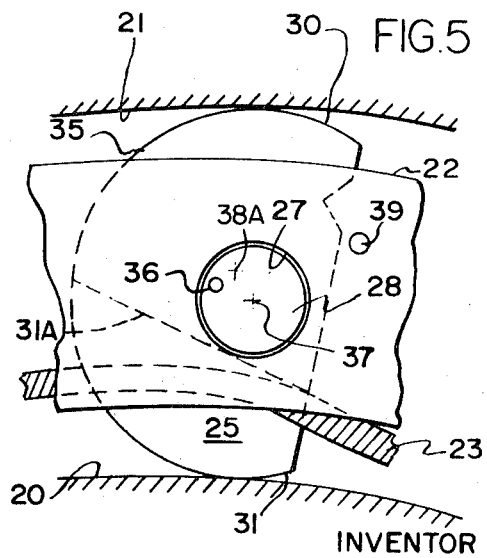
FIG 5 is an axial view of a sprag adapted to disengage the inner race during overrunning of the outer race.

The sprags 25 to be used in an outer race overrunning situation are shown in FIG. 5 and are of a specific configuration whereby a counterweight portion 35 is provided on the left side thereof so that the center of gravity 36 of the sprags 25 will be spaced to the left from the center of rotation 37 of the trunnions 28 thereof. In the situation where the outer race 21 is going to be overrunning, on occasion, the sprag outer cam surfaces 30 have a center of curvature located substantially in the center of rotation 37 of the cam trunnions 28. In this situation, the sprag inner race cam surfaces 31 have a center of curvature 38A which is generally spaced outwardly and to the left of the center of rotation 37 of the sprags 25.

In operation, when the outer race 21 is overrunning in a relatively clockwise direction with respect to the inner race 20, the sprag cage assembly 15 will be carried with the outer race 21 by a drag friction spring 26 therebetween and accordingly, the sprags 25 will move with the outer race 21. As the speed of the outer race 21 increases, the sprags 25 will be urged clockwise (FIGS. 2 and 4) about their axis 37 with greater and greater force due to centrifugal force acting on the eccentric center of gravity 36 thereof.

The rotation of the sprags 25 due to the centrifugal force will be resisted by the expanding energizing spring 23 until the rotational speed of the sprag reaches a point where the centrifugal action on the sprags 25 is equal to or greater than the expanding force of the energizing spring 23, after which further increase in rotational speed of the sprag assembly 15 will cause the sprags 25 thereof to rotate clockwise (FIG. 4) with respect to the trunnion axis 37 in the cage rings 22. When this centrifugal rotation of the sprag takes place, the outer race cam engaging surfaces 30 will roll on the outer race surface 21 about the axis 37 of the sprag trunnions 28, and the inner race cam engaging surface 31 of the sprags 25 will be rotated out of engagement with the inner race 20 to provide a complete disengagement between the sprags 25 and the inner race 20 during the overrunning of the outer race 21 beyond the predetermined centrifugal speed to overcome the expanding energizing force of the spring 23. To maintain the sprags 25 in position for ready and appropriate driving reengagement with the outer and inner races 20 and 21 after this disengagement as above described, the sprags 25 may be restrained from excessive centrifugal rotation at excessively high overrunning speeds by providing the crossbar stop 39 between the cage rings 22 adjacent the sprags 25 or the sprags 25 may be sufficiently closely positioned to one another to engage one another after a predetermined centrifugal rotation action to prevent undue rotation thereof.

In summary, it is to be noted, that the sprag assembly 15 for one-way overrunning clutches which is provided by this invention provides a sprag assembly structure whereby the sprags 25 thereof will be completely disengaged from the race which is being overrun, when the overrunning race exceeds a predetermined rotational speed and thereby preventing the undesirable localized sliding wear of the sprags which would otherwise eventually effect the proper and efficient operation thereof.

It is to be understood that the invention is not to be limited to the specific constructions and arrangements shown and described, as it will be understood to those skilled in the art that changes may be made without departing from the principles of the invention.

I claim:

1. A sprag assembly for one-way overrunning clutches having an inner and an outer race comprising a sprag cage for retaining sprags between the inner and the outer races, a series of sprags rotatably mounted in said cage and about axes fixed with respect to the cage, said sprags having inner and outer race cam surfaces normally engaging the inner and outer races respectively when rotated in one direction to provide a drive between said races and tending to disengage and drag on adjacent races in the other direction to provide a nondriving overrunning condition between said races, and means in engagement with said sprags for urging said sprags rotatably in said one direction, said sprags having a counterweight portion for rotatably urging said sprags in the other direction under the effects of centrifugal force when said cage is rotated in overrunning condition with one of said races for overcoming the effects of said sprag engaging and urging means at a predetermined rotational speed to cause said sprags to completely disengage from said races during overrunning above said predetermined speed.

2. A sprag assembly as recited in claim 1, wherein said sprags have trunnions supported by said cage, the longitudinal centers thereof defining said axes and the centers of rotation of said sprags.

3. A sprag assembly as defined in claim 2 whereby said sprag cam surfaces (31) adjacent said inner race have a center of curvature spaced outwardly from the center of rotation of said sprags.

4. A sprag assembly as defined in claim 2 wherein said sprag outer cam surfaces have a center of curvature spaced inwardly from the center of rotation of said sprags.

5. A sprag assembly as defined in claim 2, wherein said sprags are provided with a transverse surface spaced radially outwardly from the center of rotation thereof, and said means for rotatably urging said sprags in the one direction is a resilient radially expanding means in engagement with said transverse surface.

6. A sprag assembly as defined in claim 5 wherein a means is provided for yieldably urging said cage to rotate with an overrunning race to impart rotation to said cage and effect said sprag centrifugal rotation.

7. A sprag assembly as defined in claim 2 wherein a means is provided for yieldably urging said cage to rotate with an overrunning race to impart rotation to said cage and effect said sprag, centrifugal rotation.

8. A sprag assembly as defined in claim 7 wherein said yieldably urging means is a resilient member secured to said cage and is spring biased into frictional engagement with said overrunning race.

9. A sprag assembly as defined in claim 8 whereby said sprag cam surfaces (31) adjacent said inner race have a center of curvature spaced outwardly from the center of rotation of said sprags.

10. A sprag assembly as defined in claim 8 wherein said sprag outer cam surfaces have a center of curvature spaced inwardly from the center of rotation of said sprags.